US009725945B2

(12) United States Patent
Swank et al.

(10) Patent No.: US 9,725,945 B2
(45) Date of Patent: Aug. 8, 2017

(54) DOORSILL

(71) Applicant: Endura Products, Inc., Colfax, NC (US)

(72) Inventors: Thomas C. Swank, Mayodan, NC (US); Tomasz Jaskiewicz, Winston-Salem, NC (US); Bruce E. Procton, Greensboro, NC (US); George Heid, Charlotte, NC (US); Brent Van Camp, Charlotte, NC (US); Michael K. Mitchell, Winston-Salem, NC (US)

(73) Assignee: Endura Products, Inc., Colfax, NC (US)

( * ) Notice: Subject to any disclaimer, the term of this patent is extended or adjusted under 35 U.S.C. 154(b) by 0 days.

(21) Appl. No.: 14/881,625

(22) Filed: Oct. 13, 2015

(65) Prior Publication Data

US 2017/0101817 A1 Apr. 13, 2017

(51) Int. Cl.
*E06B 1/70* (2006.01)
*E06B 7/18* (2006.01)
*E06B 7/23* (2006.01)

(52) U.S. Cl.
CPC .............. *E06B 1/70* (2013.01); *E06B 7/18* (2013.01); *E06B 7/2316* (2013.01)

(58) Field of Classification Search
None
See application file for complete search history.

(56) References Cited

U.S. PATENT DOCUMENTS

| 386,084 | A | * | 7/1888 | Pratt et al. | E06B 1/70 49/468 |
|---|---|---|---|---|---|
| 1,910,260 | A | | 5/1933 | Reher | |
| 2,089,380 | A | | 8/1937 | Krammerer | |
| 3,032,837 | A | | 5/1962 | Ramsey | |
| 3,032,839 | A | | 5/1962 | Miller | |
| 3,072,976 | A | * | 1/1963 | Klaas | E06B 1/70 49/468 |
| 3,402,512 | A | * | 9/1968 | Peterson | E06B 1/70 49/468 |
| 3,521,404 | A | | 7/1970 | Hager et al. | |
| 3,762,100 | A | | 10/1973 | Kempel | |
| 3,774,343 | A | | 11/1973 | Cribben et al. | |
| 3,962,828 | A | | 6/1976 | McAllister | |
| 4,055,917 | A | | 11/1977 | Coller | |
| 4,079,550 | A | | 3/1978 | Bursk et al. | |

(Continued)

FOREIGN PATENT DOCUMENTS

WO 0173249 10/2001

OTHER PUBLICATIONS

Application as filed (U.S. Appl. No. 10/683,312, filed Oct. 10, 2003); Final Office Action, mailed Jan. 11, 2008; Notice of Abandonment, mailed Jul. 25, 2008, pp. 1-30.

(Continued)

*Primary Examiner* — Katherine Mitchell
*Assistant Examiner* — Marcus Menezes
(74) *Attorney, Agent, or Firm* — Womble Carlyle Sandridge & Rice, LLP

(57) ABSTRACT

A doorsill for forming the bottom of an entryway. The doorsill has a substrate to be disposed above a subfloor and a lifter provided on the substrate capable of extending from a bottom of the substrate. The lifter is adjustable to change the orientation or position of the bottom relative to the subfloor.

18 Claims, 10 Drawing Sheets

(56) References Cited

U.S. PATENT DOCUMENTS

| | | |
|---|---|---|
| 4,156,325 A | 5/1979 | McMullen et al. |
| 4,222,200 A | 9/1980 | Beimes |
| 4,224,766 A | 9/1980 | Procton |
| 4,237,664 A | 12/1980 | Wilmes |
| 4,287,684 A | 9/1981 | McKann |
| 4,310,991 A | 1/1982 | Seely |
| 4,352,258 A | 10/1982 | Bursk et al. |
| 4,399,636 A | 8/1983 | Blackwell |
| 4,399,927 A | 8/1983 | Yaotani et al. |
| 4,411,104 A | 10/1983 | Aubin |
| 4,447,987 A | 5/1984 | Lesosky |
| 4,473,981 A | 10/1984 | Simpson |
| 4,513,536 A | 4/1985 | Giguere |
| 4,578,905 A | 4/1986 | Hout |
| 4,631,866 A | 12/1986 | Otto et al. |
| 4,945,680 A | 8/1990 | Giguere |
| 4,956,952 A | 9/1990 | Bancroft |
| 5,012,614 A | 5/1991 | Shea |
| 5,136,814 A | 8/1992 | Headrick |
| 5,179,804 A | 1/1993 | Young |
| 5,230,181 A | 7/1993 | Geoffrey et al. |
| 5,283,977 A | 2/1994 | Smith |
| 5,303,895 A * | 4/1994 | Hart ................ A47G 1/168 248/475.1 |
| 5,426,894 A | 6/1995 | Headrick |
| 5,517,788 A | 5/1996 | McGough et al. |
| 5,524,391 A | 6/1996 | Joffe et al. |
| 5,588,266 A | 12/1996 | Headrick |
| 5,611,173 A | 3/1997 | Headrick et al. |
| 5,638,641 A * | 6/1997 | Joffe ................ E06B 1/524 49/467 |
| 5,673,517 A | 10/1997 | Stanclift |
| 5,943,825 A | 8/1999 | Procton et al. |
| 6,006,375 A | 12/1999 | Carr |
| 6,044,600 A | 4/2000 | McCollough |
| 6,052,949 A | 4/2000 | Procton et al. |
| 6,125,584 A | 10/2000 | Sanders |
| 6,125,599 A | 10/2000 | Mees et al. |
| 6,138,413 A | 10/2000 | Fehr |
| 6,185,870 B1 * | 2/2001 | Mettler ................ E06B 1/70 411/183 |
| 6,216,395 B1 | 4/2001 | Kelly |
| 6,269,591 B1 | 8/2001 | Kelly |
| 6,289,635 B1 | 9/2001 | Procton et al. |
| 6,345,477 B1 | 2/2002 | Kepler et al. |
| 6,367,201 B1 | 4/2002 | Massey et al. |
| 6,371,188 B1 | 4/2002 | Baczuk et al. |
| 6,484,446 B2 | 11/2002 | Young |
| 6,625,941 B2 | 9/2003 | Shaw |
| 6,763,639 B2 | 7/2004 | Bennett et al. |
| 6,789,358 B2 | 9/2004 | Procton et al. |
| 6,829,864 B2 | 12/2004 | Mitchell et al. |
| 7,111,433 B2 | 9/2006 | Kerscher |
| 7,263,808 B2 | 9/2007 | Massey et al. |
| 7,266,929 B1 | 9/2007 | Allred et al. |
| 7,350,336 B2 | 4/2008 | Bennett |
| 7,389,611 B2 | 6/2008 | Palenske |
| 7,472,516 B2 | 1/2009 | Pepper et al. |
| 7,536,833 B2 | 5/2009 | Baczuk et al. |
| 7,540,699 B2 | 6/2009 | Selle |
| 7,600,346 B2 | 10/2009 | Meeks |
| 7,674,081 B2 * | 3/2010 | Selle ................ F16B 27/00 411/179 |
| 7,694,471 B2 | 4/2010 | Meeks et al. |
| 7,775,011 B2 | 8/2010 | Baczuk et al. |
| 7,788,863 B2 | 9/2010 | Pepper et al. |
| D638,143 S | 5/2011 | Procton et al. |
| 8,061,086 B2 | 11/2011 | Haun |
| 8,413,383 B2 * | 4/2013 | Van Camp ................ E06B 1/70 49/468 |
| 8,490,332 B2 | 7/2013 | Van Camp et al. |
| 8,567,128 B2 | 10/2013 | Van Camp et al. |
| 2002/0194787 A1 | 12/2002 | Bennett |
| 2003/0111297 A1 | 6/2003 | Friedman et al. |
| 2004/0128925 A1 | 7/2004 | Massey |
| 2004/0139667 A1 | 7/2004 | Massey et al. |
| 2004/0200152 A1 | 10/2004 | Khanlarian |
| 2004/0200153 A1 | 10/2004 | Khanlarian |
| 2005/0210754 A1 | 9/2005 | Ferrell |
| 2005/0232724 A1 | 10/2005 | Selle |
| 2006/0053707 A1 | 3/2006 | Palenske |
| 2006/0174545 A1 | 8/2006 | Young |
| 2008/0172957 A1 | 7/2008 | Kerscher |
| 2008/0229669 A1 | 9/2008 | Abdollahzadeh et al. |
| 2009/0199486 A1 | 8/2009 | Wernlund et al. |
| 2013/0047518 A1 | 2/2013 | Van Camp et al. |
| 2013/0098472 A1 * | 4/2013 | Farkas ................ E03F 5/04 137/15.01 |

OTHER PUBLICATIONS

Application as filed (U.S. Appl. No. 11/241,753, filed Sep. 30, 2005); Final Office Action, mailed Dec. 14, 2009; Notice of Abandonment, mailed Jun. 24, 2010, pp. 1-44.

Official Action for Canadian Serial No. 2,753,768, dated Feb. 14, 2013, 3 pgs.

Official Action for U.S. Appl. No. 13/009,449, dated Feb. 4, 2013, 10 pgs.

Official Action for U.S. Appl. No. 13/367,875, dated May 9, 2013, 9 pgs.

Official Action of U.S. Appl. No. 13/009,449, dated Aug. 1, 2012, 13 pgs.

* cited by examiner

DOORSILL

FIELD OF DISCLOSURE

The present disclosure relates to building entryways, and more particularly to the doorsills or the thresholds of the entryways.

BACKGROUND

Doorsills play an important role in creating a barrier between the exterior and the interior of a building. Many doorsills are designed to form an air and watertight seal with the bottom of active and/or inactive door panels. Many doorsills are designed with water management in particular in mind, designed to move water away from the door to minimize or eliminate water penetrating over, under, or around the doorsill and into the building. Unwanted water can lead to interior damage to the floor or subfloor within the building.

Designers of doorsills seek to effectively manage sealing and water management. In many cases, water management features within doorsills use ramps or angled surfaces that rely on gravity to function correctly. In most instances, seals between a door and a doorsill function most effectively when everything is properly aligned. Imperfections in the subfloor, in a sill pan, in other framing portions of the entryway, or with the hanging of door panels limit the ability to easily achieve the desired alignment.

There is a need, therefore, for a doorsill that assists with approaching and maintaining desired alignment for maximizing the functionality of a doorsill to manage water and maintain the desired seals between an exterior and an interior of a building.

SUMMARY

The present disclosure describes doorsills and entryways having the same. The present disclosure provides methods of installing and using the doorsills. The doorsills described by this disclosure have several features that may be advantageous individually as well as collectively. The features described herein may be found alone or in a variety of combinations within a single doorsill or entryway. Applicants should be understood to possess the features of each embodiment and the products and processes that result from the combining aspects of one or more embodiment.

Embodiments of the present disclosure include a doorsill for forming the bottom of an entryway. The doorsill has a substrate to be disposed above a subfloor and a lifter provided on the substrate capable of extending from a bottom of the substrate. The lifter is adjustable to change the orientation or position of the bottom relative to the subfloor.

Embodiments of the present disclosure also include a doorsill comprising a substrate having a top side and a bottom side, the substrate comprising a plurality of threaded bores passing from the top side to the bottom side. The doorsill also includes a plurality of adjustment screws threaded into the threaded bores. Rotating the adjustment screws from the top side of the substrate causes a head of the adjustment screw to extend or retract relative to the bottom side of the substrate. The doorsill also includes a sill deck removably positioned over the top side of the substrate that covers the adjustment screws.

Also described herein is a method of adjusting a doorsill comprising positioning the doorsill upon a subfloor or a sill pan and adjusting one or more of a plurality of jacks provided on a substrate of the doorsill to extend or retract from a bottom of the doorsill.

Further embodiments include a doorsill comprising a substrate, at least one indicator attached to the substrate, and a sill deck attachable to the substrate to hide the at least one indicator. The indicator suggests when the substrate has been oriented and installed in a level position.

Other embodiments include a doorsill comprising a substrate having at least one channel extending along a length direction of the substrate, a mull spacer selectively positioned along the length of the substrate by at least one leg extending from the bottom of the mull spacer into the channel, and a sill deck disposed over the substrate. The sill deck may have a notch positioned to at least partially surround the mull spacer.

Yet other embodiments include a doorsill comprising a substrate, a dam removably attached to the substrate, and a sill deck detachable from the dam. The dam may have a lower portion thereof that engages the substrate and a first horizontal wall extending inwardly from the dam at a position offset from the bottom of the dam.

In still other embodiments, the disclosure describes a doorsill comprising a dam attached to a sill deck with a detachable connection such that the sill deck can be removed and replaced. The detachable connection may include a male portion provided on one of the dam and the sill deck, a female portion provided on the other of the dam and the sill deck, and a V-shaped sealing member within the female portion and configured to at least partially surround the end of the male portion.

A doorsill is also provided that may include a substrate having a top side, and a sill deck disposed on the substrate. The sill deck may have a tread wall and at least one support. The support separates the tread wall from the top side of the substrate. At least one stop projects upwardly from the top side of the substrate adjacent to the at least one support to minimize unwanted sliding of the sill deck relative to the substrate.

An entryway is also included that has a doorsill and a pair of side jambs, the side jambs having stop portions that extend over the ends of the doorsill. The doorsill may include a substrate having a top side, and a sill deck removably disposed on the substrate. The sill deck may have a tread wall and at least one support. The support spaces the tread wall from the top side of the substrate. The top side of the substrate may have at least one relief region providing an area of increased margin between the top side of the substrate and a bottom of the stop portion to assist with removal of the sill deck from the entryway.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

The foregoing and still other objects and advantages of the present invention will be more apparent from the following detailed explanation of embodiments of the invention in connection with the accompanying drawings.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 1:
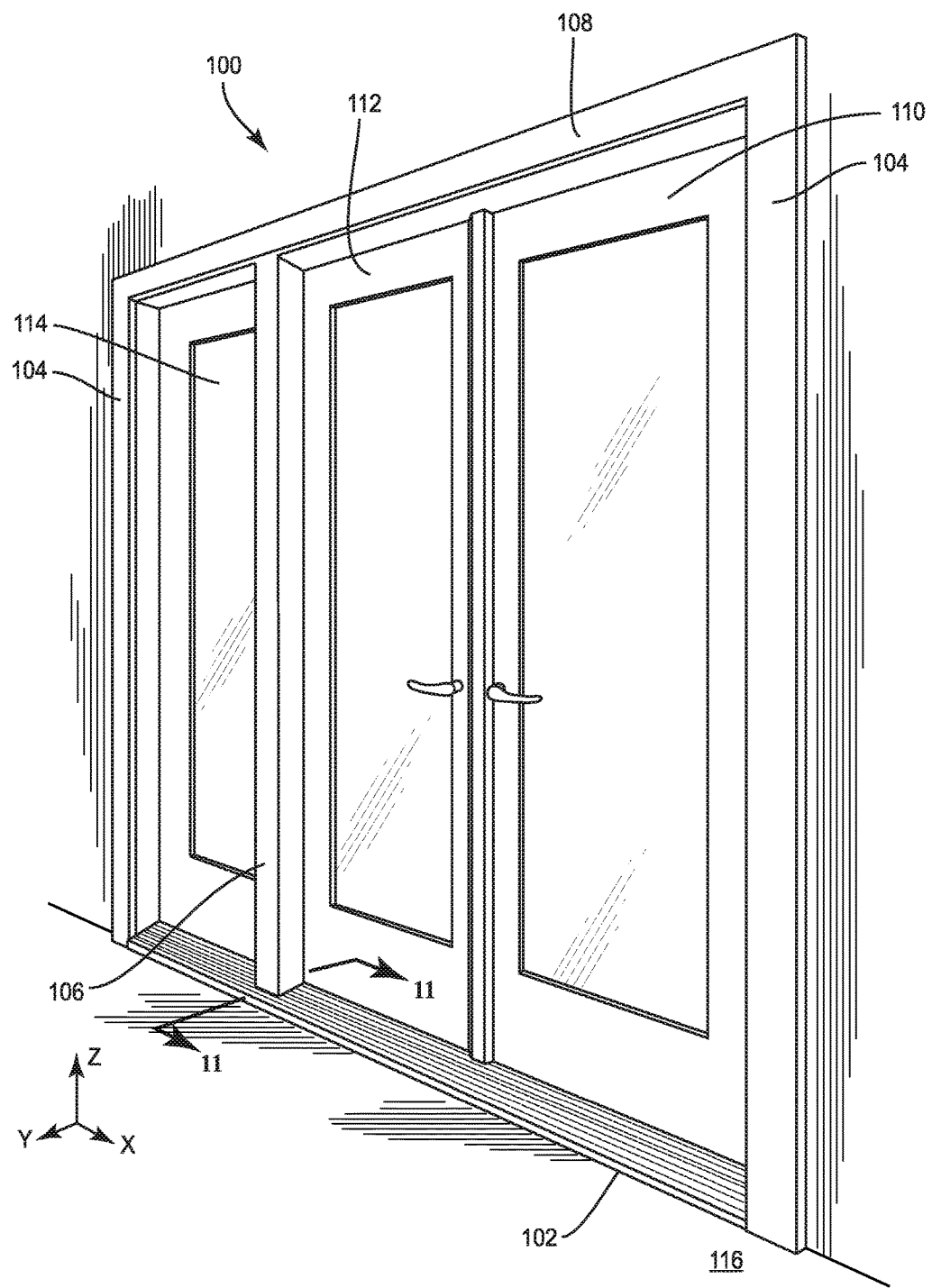
FIG. 1 is a representative entryway suitable for the doorsills described herein.

FIG. 1 illustrates an entryway 100 having a doorsill 102, a pair of side jambs 104, and a mullion 106 extending upwardly from the doorsill 102. A header 108 spans across the top of the side jambs and the mullion. An active door 110, a passive door 112, and a side light 114 are all seen in FIG. 1. The entryway 100 forms a partition between an interior and an exterior of a building. The doorsill 102 is disposed above a subfloor 116 or other support surface. A sill pan (not shown) may be located between the subfloor 116 and the doorsill 102 to help prevent water penetration below the doorsill.

Figure 2:
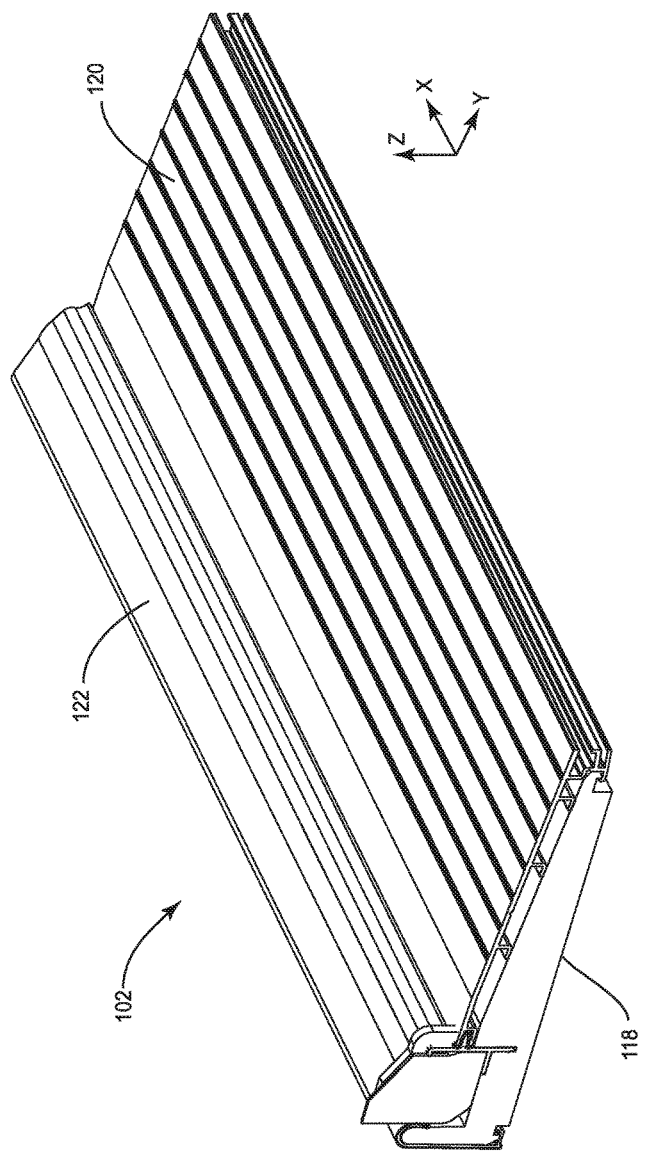
FIG. 2 is a left top isometric view of a doorsill according to embodiments of the present disclosure.

FIG. 2 is a left top isometric view of a doorsill 102 according to embodiments of the present disclosure. As used herein, the terms "doorsill" and "threshold" may be used interchangeably. The doorsill 102 may generally include a substrate 118 and a sill deck 120. The substrate 118 can be understood as being placed above the subfloor 116 (FIG. 1) or other support surface. For example, a sill pan may be placed between the substrate 118 of the doorsill 102 and the subfloor 116. The sill deck 120 may be disposed above the substrate 118 to provide a tread surface. The doorsill 102 is shown with an optional threshold cap 122. Suitable threshold caps are described in U.S. Pat. Nos. 8,991,100 and 8,567,128 assigned to Endura Products, Inc, Colfax, N.C. Several features of the doorsill 102 will now be described in more detail.

Lifting/Leveling Features

FIGS. 3-6 show embodiments that facilitate the adjustment of the position or orientation of the doorsill 102 within the entryway 100. Proper positioning of the doorsill 102 may improve sealing between the doorsill 102 and the door panels as well as improving water management.

Figure 3:
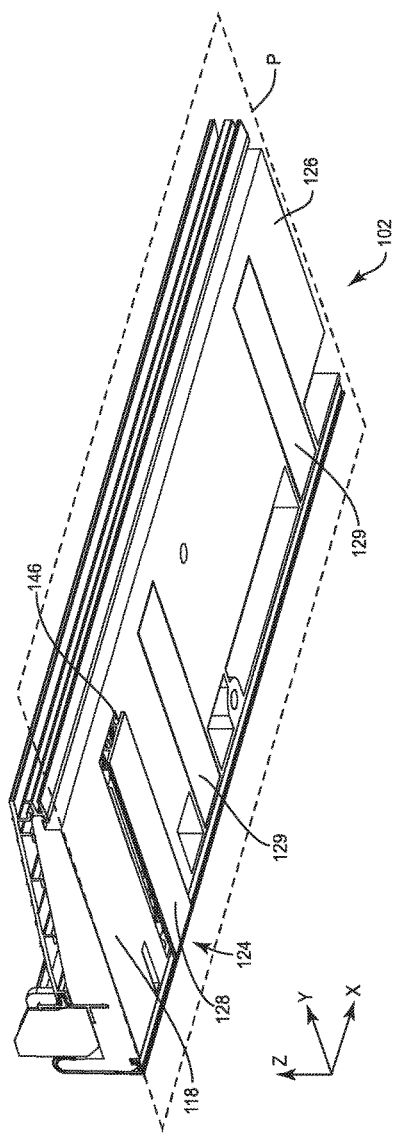
FIG. 3 is a bottom isometric view of the doorsill from FIG. 2.

FIG. 3 is a left bottom isometric view of the doorsill 102. As used herein, the X direction corresponds with the length of the doorsill 102 and extends along a left-right direction. Orientation about the X-direction or an axis parallel thereto may be referred to as tilt. The Y direction corresponds to the width of the doorsill 102 and extends in the direction through the entryway 100. Orientation about the Y-direction or an axis parallel thereto may be referred to as pitch. The Z direction corresponds with the height direction of the entryway 100 along which elements may be raised or lowered.

In some embodiments, the substrate 118 is provided with a lifter 124. The lifter 124 has portions designed to extend and retract in a downward direction relative to a bottom surface 126 of the substrate 118. Extending at least a portion of the lifter 124 from the bottom surface 126 may impact the orientation of the substrate 118 relative to the subfloor 116 (FIG. 1), a sill pan, a door panel found above the doorsill 102, or gravity. The lifter 124 may be able to make one or more of the following adjustments of the doorsill 102: raise and lower the doorsill 102 along a height direction (Z); adjust the tilt of the doorsill 102 about the X-direction; and adjust the pitch of the doorsill 102 about the Y-direction.

In one embodiment, the substrate 118, and therefore the doorsill 102 seeks to be installed in a level, horizontal manner. The bottom surface 126 may define a reference plane P having a major axis of the substrate 118 running in the X-direction and a minor axis of the substrate 118 running in the Y-direction. As used herein, the terms "horizontal" and "level" are used interchangeably to describe an orientation relative to the earth as defined by gravity as is understood in the building and construction industry, where the substrate 118 is fully level when gravity is acting in a direction that is normal to the reference plane P. In other words, true level occurs when gravity is acting both perpendicular to the major axis (x-direction) and perpendicular to the minor axis (y-direction). When the reference plane P is normal to gravity, any surfaces of the doorsill 102 that are angled relative to the reference plane P may be oriented with the desired slope for water management. While controlling both tilt and pitch is preferred to achieve a true or fully level position, applicants envision other embodiments with lifters that allow for correction of the doorsill orientation with respect to only one of the tilt about the x-direction or pitch about the y-direction.

The lifter 124 shown in FIG. 3 shows a plurality of jacks 128, 129. A first jack 128 nearest the left edge of the doorsill 102 in FIG. 3 is shown extended relative to the bottom surface 126. In the illustrated embodiment, a pair of second jacks 129 are shown retracted, e.g. flush, with the bottom surface 126. The lifter 124 is preferably provided with sufficient adjustability to place the doorsill 102 in a fully level position as defined above.

In the illustrated embodiment of FIG. 3, the lifter 124 includes a plurality of jacks 128, 129. The jacks 128, 129 are spaced apart along a length of the substrate 118. Adjusting, i.e. extending or retracting, the jacks 128, 129 relative to the bottom surface 126, and each other, may shift the orientation of the doorsill 102 with respect to an axis parallel to the Y-direction.

Figure 4:
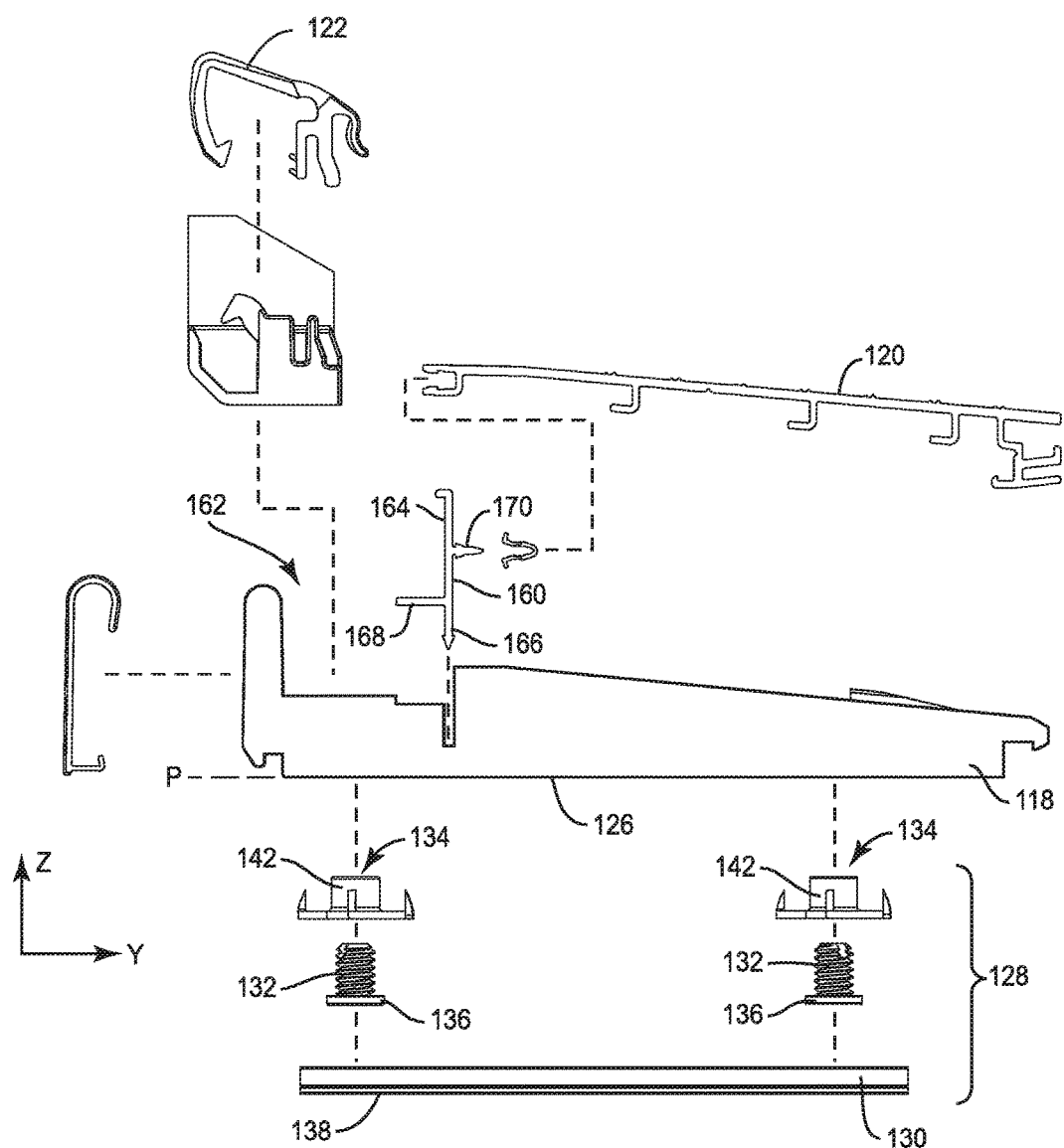
FIG. 4 is an exploded side view of the doorsill from FIG. 2.

FIG. 4 shows an exploded end view of the doorsill 102. From this view, each jack 128, 129 is shown as possibly including a pad 130 and at least one adjustment screw 132 connecting the pad 130 to the substrate 118. Each screw 132 may fit in a threaded bore 134 (FIG. 6) passing from a top side to a bottom side of the substrate 118. Rotating the screw 132 within the threaded bore 134 may extend or retract a head 136 of the screw relative to the bottom surface 126 of the substrate 118, which in turn may move at least a portion of the pad 130 relative to the bottom surface 126. In one embodiment, the head 136 of the screw 132 may be sufficiently broad to provide a support surface such that the pad 130 may be omitted. Phrased another way, the screw may be integrated with the pad such that the head 136 and the pad 130 are one in the same.

As seen in FIG. 4, the jack 128, 129 of the present embodiment may have a pair of screws 132 attached near opposite ends of a single elongated pad 130. In the illustrated configuration, each jack 128, 129 may provide for the adjustment of the doorsill 102 with respect to the pitch (i.e. rotation about an axis extending along the X-direction) by rotating one of the screws 132 attached to the pad 130 more than the other of the screws 132 attached to the same pad. In other words, a support surface 138 defined by the pad 130 will be angled relative to the bottom surface 126 of the substrate 118. In other embodiments, each pad 130 may be associated with a single adjustment screw 132. In yet other embodiments, larger pads may be operably attached to more than two adjustment screws.

Figure 5:
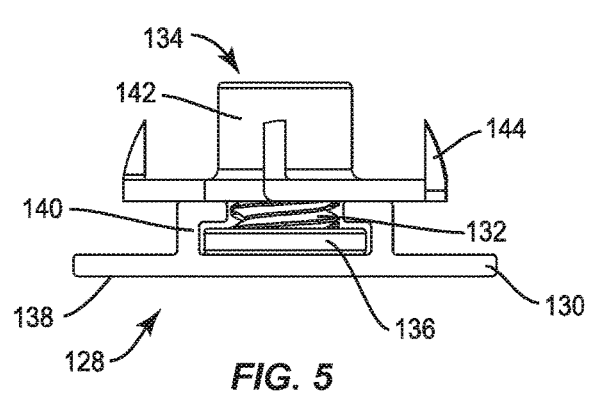
FIG. 5 is a front view of a jack found in the doorsill of FIG. 2.

FIG. 5 shows a front view of a jack 128, 129 in a fully retracted position according to one embodiment. The pad 130 has a support surface 138 on the bottom thereof and an attachment channel 140 formed on the top thereof. The head 136 of the screw 132 may be sized and shaped to slide into the attachment channel 140. An optional plug 142 may be included to form the threaded bore 134 therewith. In the fully retracted position, the plug 142 may abut the pad 130. The plug 142 may be a durable metal element configured to be inserted into apertures through the substrate 118. In other embodiments, the plugs 142 may be omitted and the threaded bores 134 may be provided directly within the material forming the substrate 118. The plugs 142 may be fixed to the substrate with barbs 144, adhesive, or other suitable approaches known in the art.

Figure 6:
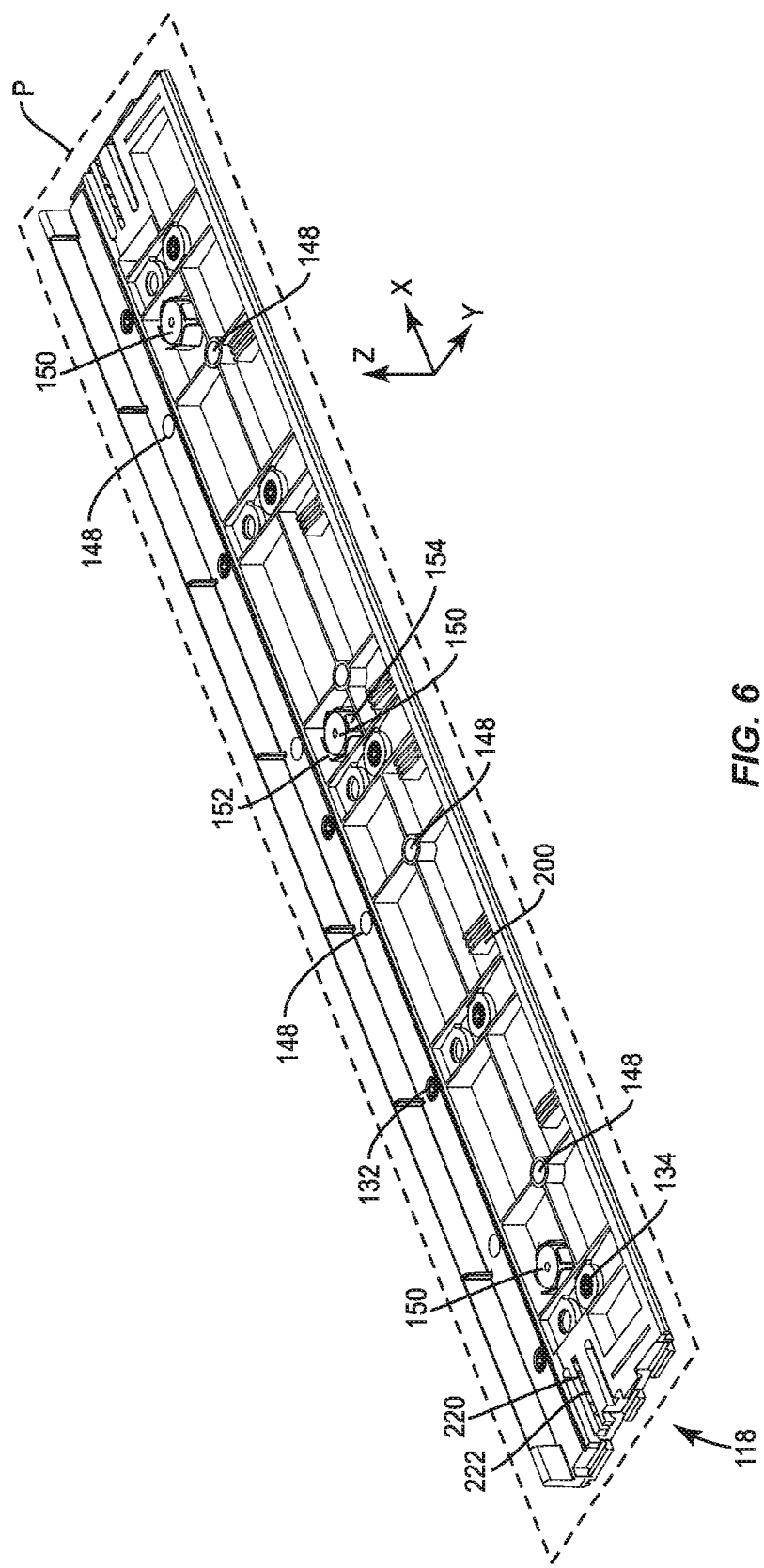
FIG. 6 is a top isometric view of a substrate according to embodiments described herein.

FIG. 6 is an isometric left top view of the substrate 118. The threaded bores 134 are shown. Each bore may accommodate an adjustment screw 132. Prior to installing the sill deck and the threshold cap upon the substrate 118, an adjustment screw 132 may be accessed for adjusting one or more of the jacks of the lifter so that the substrate 118 is provided with the desired orientation upon the subfloor, sill pan, or other underlying element. In some embodiments, as will be discussed further below, the sill deck and the threshold cap may be removably attached to the substrate 118 so that the lifter may be operated via the adjustment screws 132 after the doorsill has been installed in an entryway by removing the sill deck from the substrate 118.

Returning to FIG. 3, the bottom surface 126 of the substrate 118 may be provided with recesses 146 configured to fully receive each pad 130 in a fully retracted position. The fully retracted position may occur when the support surface of the pad 130 is flush with the bottom surface 126 and coplanar with the reference plane P as is shown with second jacks 129. The substrate 118 may be shipped with each of the jacks 128, 129 in their fully retracted position. In one embodiment, each jack 128, 129 may be able to extend the support surface 138 up to ¼ inches from the bottom surface 126 when the jack 128, 129 is in the fully extended position.

Returning to FIG. 6, the substrate 118 may be provided with other features that may be provided and used independently or in combination with the lifter 124. The substrate 118 may be formed with integral anchor points 148 for positioning fasteners that attach the substrate 118 to the subfloor 116 (FIG. 1). The fasteners, such as screws, may be required by local building codes for securing the doorsill 102 (FIG. 1) to the subfloor. The anchor points 148 may take the form of indicia, cavities, recesses, or other guides that may mark fastener placement and allow for placement of at least a portion of each fastener within the substrate 118.

FIG. 6 shows another optional feature incorporated with the substrate 118; namely, the addition of at least one indicator 150 attached to the substrate 118 to indicate an orientation of the door doorsill relative to gravity. The indicator 150 may be in the form of a bullseye type bubble level as known in the art for indicating the level orientation of a horizontal plane. The indictor 150 may be other types as well, particularly indicators that are able to provide indication with respect to more than one axis, though single axis indicators are also considered. In the illustrated embodiment, the indicator 150 may be attached to the substrate 118 in a manner, and at a location, that ensures the indicator is itself level with the reference plane P, which is parallel to the bottom surface 126. In many cases, placing a level on the top side of a conventional threshold substrate may not provide a level reading because the top side of many threshold substrates are intended to be sloped in an interior-to-exterior direction (Y-direction). On the other hand, the substrate 118 illustrated includes pre-formed pockets 152 of sufficient size for a bullseye level. A floor of each pocket 152 is parallel with the bottom surface 126 (FIG. 4). One or more resilient fins 154 may be integrated with the substrate 118 to removably hold an indicator 150 to the substrate 118. Similar to the sloping top side of many substrates, tread surfaces of many sill decks are also sloped. Therefore the indicators 150 are configured for use prior to installation of the sill deck 120 (FIG. 4) upon the substrate 118. As discussed above, the sill deck 120 may be removable. As such, the indicators 150 may be hidden from view when the sill deck is added and exposed for use when the sill deck is removed in the same manner as the screws of the lifter 124 discussed above.

Operation and use of the lifter 124 may be described in terms of one or more methods of installing a doorsill 102 in a desired orientation. The method may include actions such as positioning the doorsill 102 upon a subfloor 116 or upon a sill pan, followed by adjusting one or more of a plurality of jacks 128, 129 provided on a substrate 118 of the doorsill 102 until the substrate reaches the desired orientation. The desired orientation may require at least one of adjusting the height of the doorsill 102 relative to the subfloor 116, adjusting the pitch relative to the subfloor and adjusting the tilt relative to the subfloor or gravity. Adjusting a jack 128, 129 may include rotating an adjustment screw 132 to extend or retract a respective pad 130 relative to a bottom surface 126 of the substrate 118. A sill deck 120 may be installed upon the substrate 118 after the substrate reaches the desired position.

In some embodiments, a doorsill 102 having a lifter 124 may be adjustable after installation if provided with a removable sill deck 120 (FIG. 4). In such an embodiment, a method of adjusting the position and orientation of the doorsill 102 may include removing an existing sill deck, adjusting one or more of the plurality of jacks 128, 129, and attaching one of the existing sill deck or a replacement sill deck to the substrate 118. Where the substrate 118 is provided with one or more indicators 150, or at least locations for receiving indicators (e.g. pockets 152), the method may also include determining whether the substrate 118 has reached a position free from at least one of pitch and tilt using an indicator 150 attached to the substrate and exposed to view when the existing sill deck is removed.

As mentioned above, several of the features of the doorsill 102 may be novel and advantageous separate and apart from use with a lifter 124. Some of such features may be highlighted in terms of the following paragraphs:

Paragraph A: A doorsill comprising:
a substrate;
at least one indicator attached to the substrate, the indicator providing an indication of when the substrate is free from at least one of pitch and tilt; and
a sill deck attachable to the substrate to cover the at least one indicator when the substrate has been installed in a level position.

Paragraph B. The doorsill of Paragraph A, wherein the at least one indicator is a bubble level.

Paragraph C. The doorsill of Paragraph B, wherein the bubble level is a bullseye type providing an indication of when the substrate is free from both pitch and tilt.

Paragraph D. The doorsill of Paragraph A, wherein the at least one indicator is removably attached to the substrate.

Paragraph E. The doorsill of Paragraph D, wherein the substrate has resilient fins grouped together to removably retain a respective indicator.

Removable Sill Deck Features

As mentioned above, a substrate 118 with a lifter 124, and the use of indicators 150 may be improved when the doorsill 102 has a sill deck 120 that is capable of being installed onto and/or removed from the substrate 118 after the substrate has been installed within the entryway 100. Several optional features of the doorsill 102 have been designed with the removable sill deck in mind. Each of the features discussed below may support, individually or in combination, separate novel concepts.

Dam

Returning to FIG. 4, the exploded view of the doorsill 102 includes a dam 160 configured, in this embodiment, to be press fit to the substrate 118. As commonly found in existing thresholds, dams create an upright exterior wall of an upwardly open channel 162 into which the threshold cap 122 may be installed. As the name suggests, the dam provides an upright barrier at the end of the sill deck 120 for limiting water intrusion. Dams found within the prior art are almost exclusively formed integrally with the sill deck. On the other hand, the dam 160 of the instant embodiment is specifically constructed to be detachable from the sill deck 120 to facilitate the ability for the sill deck to be installed onto and/or removed from the substrate 118 after the substrate has been installed within the entryway 100 (FIG. 1).

Figure 7:
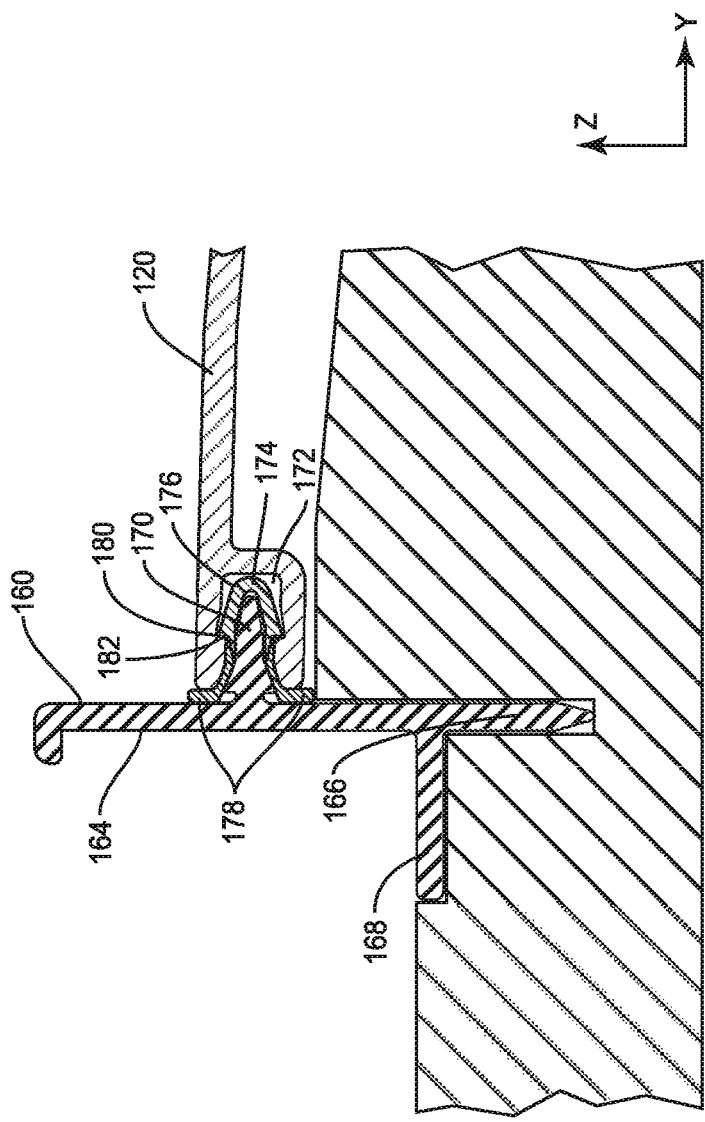
FIG. 7 is a detailed side view of the sealing region between a dam and a sill deck.

FIG. 7 shows a detailed view of the dam 160, which may include a vertical wall 164 with a lower portion 166 thereof that is snap fit or otherwise removably attached to the substrate 118. A first horizontal wall 168 may extend inwardly (i.e. relative to the Y-direction or the interior-to-exterior direction) from the dam 160 at a position offset from the bottom of the dam 160. The first horizontal wall 168 may be configured to reside at or near the bottom of the upwardly open channel 162 to provide support to the vertical wall 164. A second horizontal wall 170 may extend outwardly (i.e. relative to the Y or interior-to-exterior direction) from the vertical wall 164. The second horizontal wall 170 may extend from a position along the vertical wall 164 that is higher than the first horizontal wall 168. The second horizontal wall 170 may be configured to engage a portion of the sill deck 120.

A doorsill with a dam 160 as described by this section may be embodied by the following paragraphs:

Paragraph F. A doorsill, comprising:
a substrate;
a dam removably attached to the substrate; and
a sill deck detachable from the dam,
wherein the dam has a lower portion thereof that engages the substrate.

Paragraph G. The doorsill of Paragraph F, further comprising:
a second horizontal wall, the second horizontal wall extending outwardly from the vertical wall.

Paragraph H. The doorsill of Paragraph F, wherein the second horizontal wall extends from a position along the vertical wall that is higher than the first horizontal wall.

Paragraph I. The doorsill of Paragraph F, wherein the dam is press fit to the substrate, the sill deck is snap fit to the dam.

Seal

The detailed view of FIG. 7 shows the engagement between the dam 160, particularly the second horizontal wall 170, and the sill deck 120. The sill deck 120 may include a groove 172 for accepting the second horizontal wall 170. One skilled in the art would recognize that the arrangement of the second horizontal wall 170 and the groove 172 may be reversed, such that the dam 160 may have a female portion of the engagement and the sill deck 120 may provide the male portion of the engagement.

To assist with providing a watertight seal between the dam 160 and the sill deck 120, a seal 174 may be disposed between the second horizontal wall 170 and the groove 172. The seal 174 may be described as being V-shaped, for being snap-fit into a female portion of the joint (i.e. groove 172) and the seal 174 may be shaped to at least partially surround the end of the male portion of the joint (i.e. second horizontal wall 170.

The seal 174 can include an apex portion 176 formed from a relatively rigid metal or polymer material. The seal 174 can also include a pair of tip portions 178 formed from a relatively resilient rubber or polymer material at the tips of the V-shaped seal 174 on either side of the apex portion 176. The apex portion 176 may include outwardly projecting retention ridges 180 proximate to the interface between the apex portion 176 and the respective tip portions 178. The projecting retention ridges 180 may engage recesses 182 within the groove 172 to help maintain the seal 174 within the groove 172. To form a tight fit with the seal 174, having potentially diverging tip portions 178, the second horizontal wall 170 may be provided with a tapered profile, having a thicker portion near the vertical wall 164 of the dam 160 and becoming thinner in an outward direction.

A doorsill with a seal 174 as described by this section may be embodied by the following paragraphs:

Paragraph J. A doorsill, comprising:
a dam attached to a sill deck with a detachable connection such that the sill deck can be removed and replaced,
wherein the detachable connection comprises:
a male portion provided on one of the dam and the sill deck;
a female portion provided on the other of the dam and the sill deck; and
a seal within the female portion and configured to at least partially surround the end of the male portion.

Paragraph K. The doorsill of Paragraph J, wherein the v-shaped seal comprises an apex portion having relatively rigid material portion at the apex of the V-shape and a pair of tip portions having relatively resilient material at the tips of the V-shape.

Paragraph L. The doorsill of Paragraph K, wherein the apex portion comprises outwardly projecting retention ridges proximate to an interface between the apex portion and the respective tip portions.

Paragraph M. The doorsill of Paragraph L, wherein the female portion comprises a pair of retaining recesses to accept the retention ridges of the sealing member.

Paragraph N. The doorsill of Paragraph J, wherein the detachable connection is a snap-fit connection and the seal is snap-fit within the female portion.

Sill Deck Retention

Figure 8:
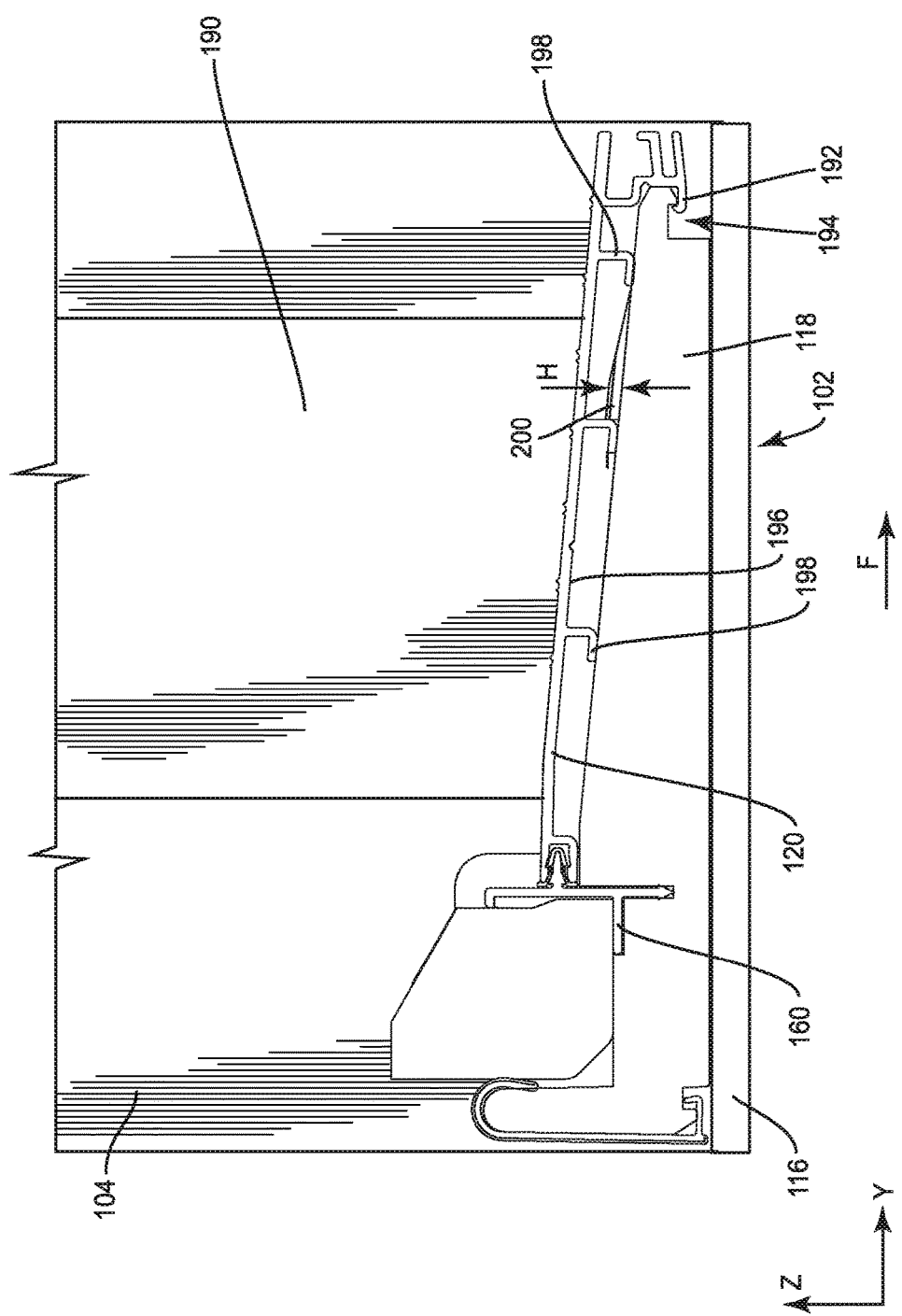
FIG. 8 is a side view of the doorsill of FIG. 2.

FIG. 8 shows a side view of a doorsill 102 with a side jamb 104 shown in the rear. The side jamb 104 includes an abutment section 190 projecting from the side jamb 104 and extending over an edge of the sill deck 120. In the illustrated embodiment, the sill deck 120 has been designed to be removable from the doorsill 102 by pulling, in the direction shown by arrow F, the sill deck 120 toward the exterior side of the entryway to release the press fit seal between the dam 160 and the sill deck 120 as described above, and to substantially allow the sill deck 120 to slide between the substrate 118 and the abutment section 190 of the side jamb 104. In some embodiments the sill deck 120 may be provided with a clip 192 at or near the exterior end thereof for engaging a catch 194 formed in the substrate 118. Beginning the process of removing the sill deck 120 may include elastically or permanently deforming the clip 192 to disengage the catch 194 prior to pulling out the sill deck 120.

To position the sill deck 120 upon the substrate 118, a tread wall 196 of the sill deck 120 may be formed with a plurality of support legs 198. The support legs 198 may extend substantially the entire length (along the X-direction) of the sill deck 120. The support legs 198 may be L-shaped as shown in FIG. 8 to have a sturdy base for contacting the substrate 118 and supporting the sill deck 120.

The ability to remove the sill deck 120 from the installed substrate 118 is advantageous for the use of many of the features discussed above. However, the sill deck 120 should not separate from the substrate 118 simply due to the forces applied by someone's foot stepping on the sill deck 120 and walking through the entryway 100. The retention of the sill deck 120 with the substrate 118 is provided in part by the fit at the seal 174 and the mating of the clip 192 with the catch 194. In addition, the substrate 118 may include a plurality of stops 200 projecting upward from a top side of the substrate 118. The stops 200 may be positioned on the substrate 118 in a location immediately exterior to the location of one or more of the support legs 198 to provide a contact surface to limit unintentional movement of the sill deck 120 toward the exterior of the entryway 100. The height H of a stop 200 may be measured as the vertical distance from the top side of the substrate 118 immediately interior of the stop 200 to the top of the stop. A representative height H is shown in FIG. 8.

Returning to FIG. 6, the stops 200 in the illustrated embodiment are shown as fin-like structures, provided in groups of three, with groups of stops 200 spaced apart along the length of the substrate 118. Further, the height H of each stop 200 may vary. In one embodiment, applicants have found that the height of stops 120 near the center of the substrate 118 may be greater than the height of the stops 118 near the ends of the substrate. Having tall stops 200 near the center imparts the most resistant to movement where the forces of a person's foot are expected to occur. Further, to facilitate removal of the sill deck 120, the center of the sill deck 120 can be bowed upwardly to a larger degree to slide over the stops 200, than the edges of the sill deck 120 due to the presence of the abutment portion of the side jamb. Therefore, if the height of the stops 200 near the ends of the substrate 118 are too tall, the sill deck may not have sufficient room to slide between the top side of the substrate and the bottom of the abutment portion.

A doorsill with a removable sill deck 120 and a substrate 118 having stops 200 as described by this section may be embodied by the following paragraphs:

Paragraph O. A doorsill, comprising:
a substrate having a top side; and
a sill deck disposed on the substrate, the sill deck having a tread wall and at least one support, the support separating the tread wall from the top side of the substrate,
wherein at least one stop projects upwardly from the top side of the substrate adjacent to the at least one support.

Paragraph P. The doorsill of Paragraph O, wherein the at least one stop comprises a plurality of stops spaced apart along a length of the substrate.

Paragraph Q. The doorsill of Paragraph P, wherein the plurality of stops vary in height along the length of the substrate, wherein a centermost stop has the tallest height.

Paragraph R. The doorsill of Paragraph P, wherein the plurality of stops are arranged in a plurality of groups, the plurality of groups being spaced along the length of the substrate.

Paragraph S. A method of removing a sill deck from an entryway, the entryway comprising a threshold substrate having a top side and at least one stop projecting upwardly from the top side, a sill deck disposed over the substrate and spaced therefrom by at least one leg, and a pair of side jambs, the side jambs having abutment portions that at least partially overlap the substrate and the sill deck, the method comprising:
pulling the sill deck in an exterior direction through a gap between the substrate and a bottom of the abutment portions; and
deforming the sill deck to allow the at least one leg to pass over the at least one stop.

Wide Doorsills

Figure 9:
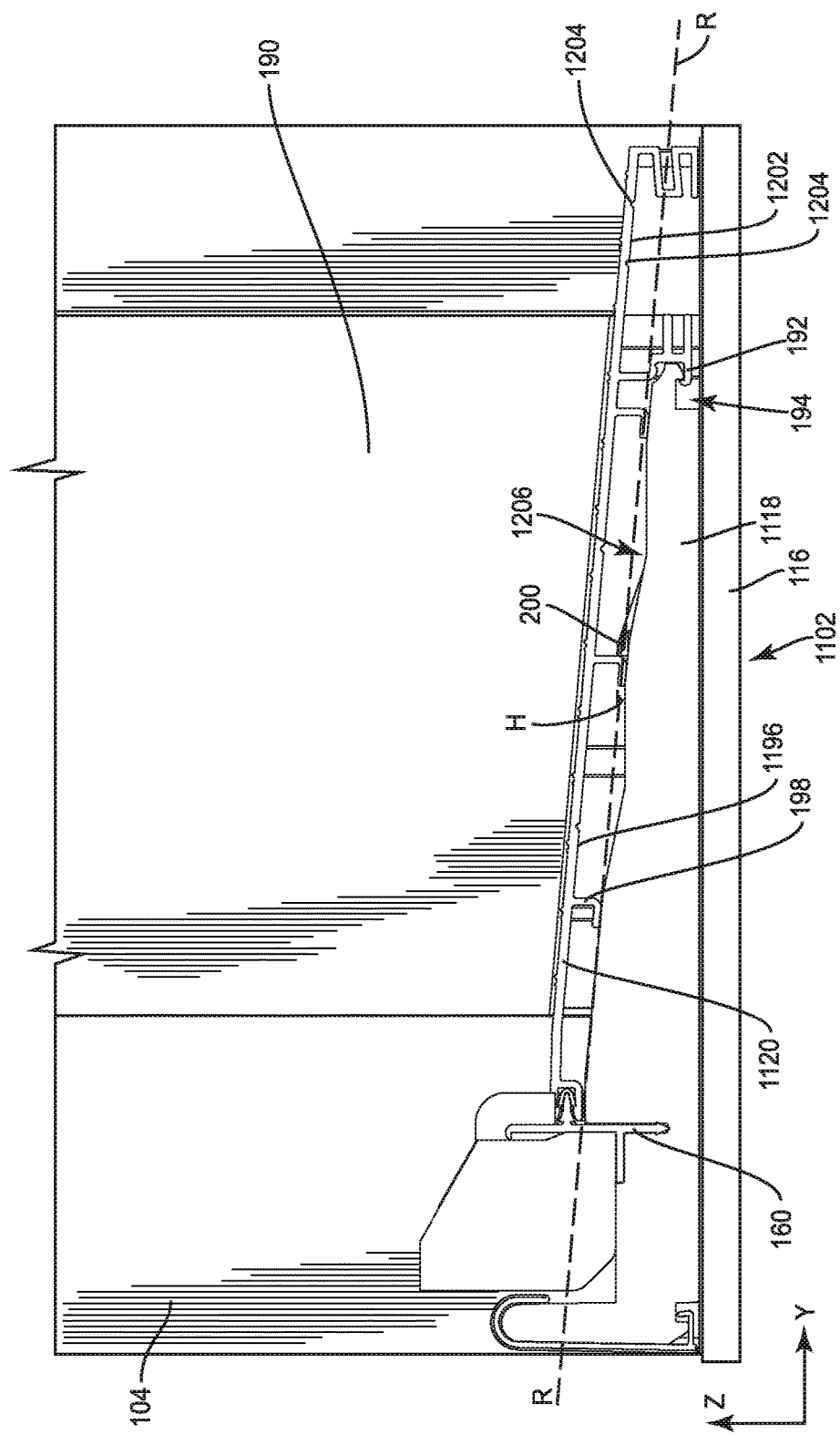
FIG. 9 is a side view of a doorsill according to another embodiment.

FIG. 9 shows a cross section of a doorsill 1102 having a substrate 1118 and a sill deck 1120 according to another embodiment. The doorsill 1102 of this second embodiment is substantially wider (in the Y-direction) than the doorsill 102 of the first embodiment (FIG. 8). A wide doorsill may be considered as at least about 6 inches wide. In the wide embodiment, the sill deck 1120 may include an extension 1202 formed beyond the clip 192 with respect to the exterior direction of the entryway 100.

Applicants have found that doorsills 1102 of a wide construction present additional challenges when seeking to provide removability for the sill deck 1120. The contact between the sill deck 1120 and the subfloor 116 coupled with the sloped tread wall 1196 impacts the ability for the sill deck 1120 to be slide out in a purely Y-direction.

To facilitate removal of the wide sill deck 1120, one or more seams 1204 may be provided in the tread wall 1196 that run along a length direction (X-direction) of the sill deck 1120. The extension 1202 may have one or more seams 1204 along which the exterior of the sill deck may be bent or broken to gain access to the clip 192. The tread wall 1196 may include one or more additional seams 1204 positioned relatively interior of the clip 192.

Figure 10:
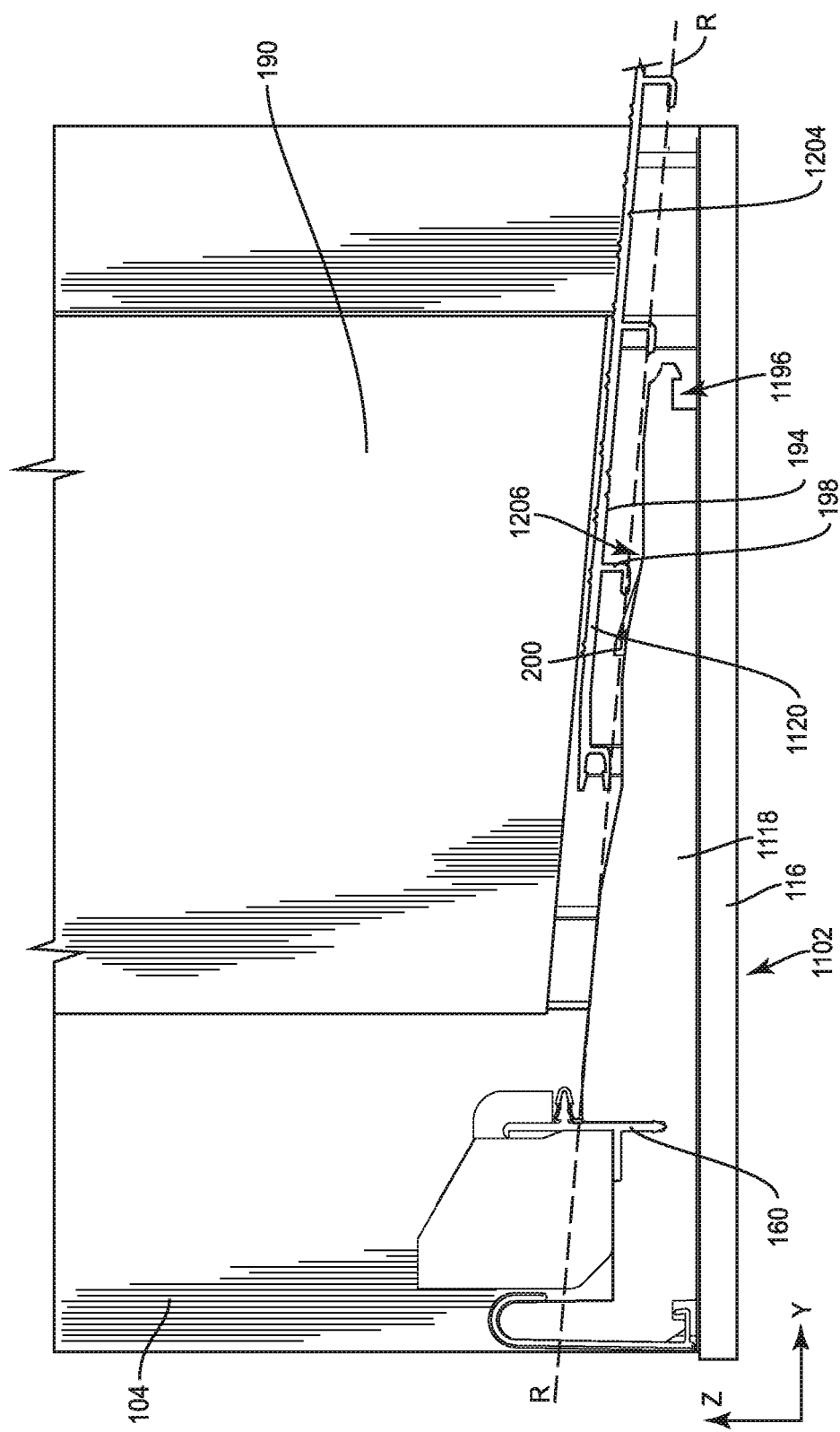
FIG. 10 is a side view of a doorsill according to FIG. 9 with the sill deck partially removed.

Additional features may be included in the substrate 1118 to further facilitate removal of the wide sill deck 1120. For example, the top side of the substrate 1118 can have at least one relief region 1206 providing an area of increased margin between the top side of the substrate 1118 and a bottom of the tread wall 1196 to assist with removal of the sill deck 1120 from the entryway 100. Described another way, the profile of the top side of the substrate 1118 may follow an imaginary downwardly sloped reference line R shown in FIG. 9. At least one portion of the top side forms a relief region 1206 with the top side temporarily dipping below the sloped reference line R to accommodate a support leg 198 as the wide sill deck 1120 is removed from the substrate 1118. While FIG. 9 shows the relief region 1206 as encompassing a gradual dip or scallop, the relief region can be other shapes such as troughs or cutouts, etc. During removal of the wide sill deck 1120, when a support leg 198 is positioned to correspond with one of the relief regions 1206, as shown in FIG. 10, a user may be able to lift the exterior end of the sill deck 1120 so the tread wall 1196 is more level with the subfloor 116 to assist with fitting the wide sill deck 1120 between the top side of the substrate 1118 and the bottom of the abutment portions 1190.

An entryway with a removable wide sill deck 1120, and a method of removing such a sill deck, as described by this section may be embodied by the following paragraphs:

Paragraph T. An entryway, comprising:
a doorsill and a pair of side jambs, the side jambs having stop portions that extend over the ends of the doorsill, wherein the doorsill comprises:
a substrate having a top side; and
a sill deck removably disposed on the substrate, the sill deck having a tread wall and at least one support, the support spacing the tread wall from the top side of the substrate,
wherein the top side of the substrate has at least one relief region providing an area of increased margin between the top side of the substrate and a bottom of the tread wall to assist with removal of the sill deck from the entryway.

Paragraph U. The entryway of Paragraph T, wherein a profile of the top side of the substrate follows an imaginary downwardly sloped line and the relief region is defined by a segments of the top side profile that are below the sloped line to accommodate the support leg as the sill deck is removed from the substrate.

Paragraph V. A method of removing a sill deck from an entryway, the entryway comprising a threshold substrate having a top side, a sill deck disposed over the substrate and spaced therefrom by at least one support, and a pair of side jambs, the side jambs having abutment portions that at least partially overlap the substrate and the sill deck, the method comprising:
pulling the sill deck in an exterior direction through a gap between the substrate and a bottom of the abutment portions; and
lifting an exterior end of the sill deck as the at least one support pass a relief scallop provided along the top side of the substrate.

Paragraph W. The method of Paragraph V, further comprising bending the sill desk along at least one seam running along a length direction of the sill deck.

Mullion Spacer

Figure 11:
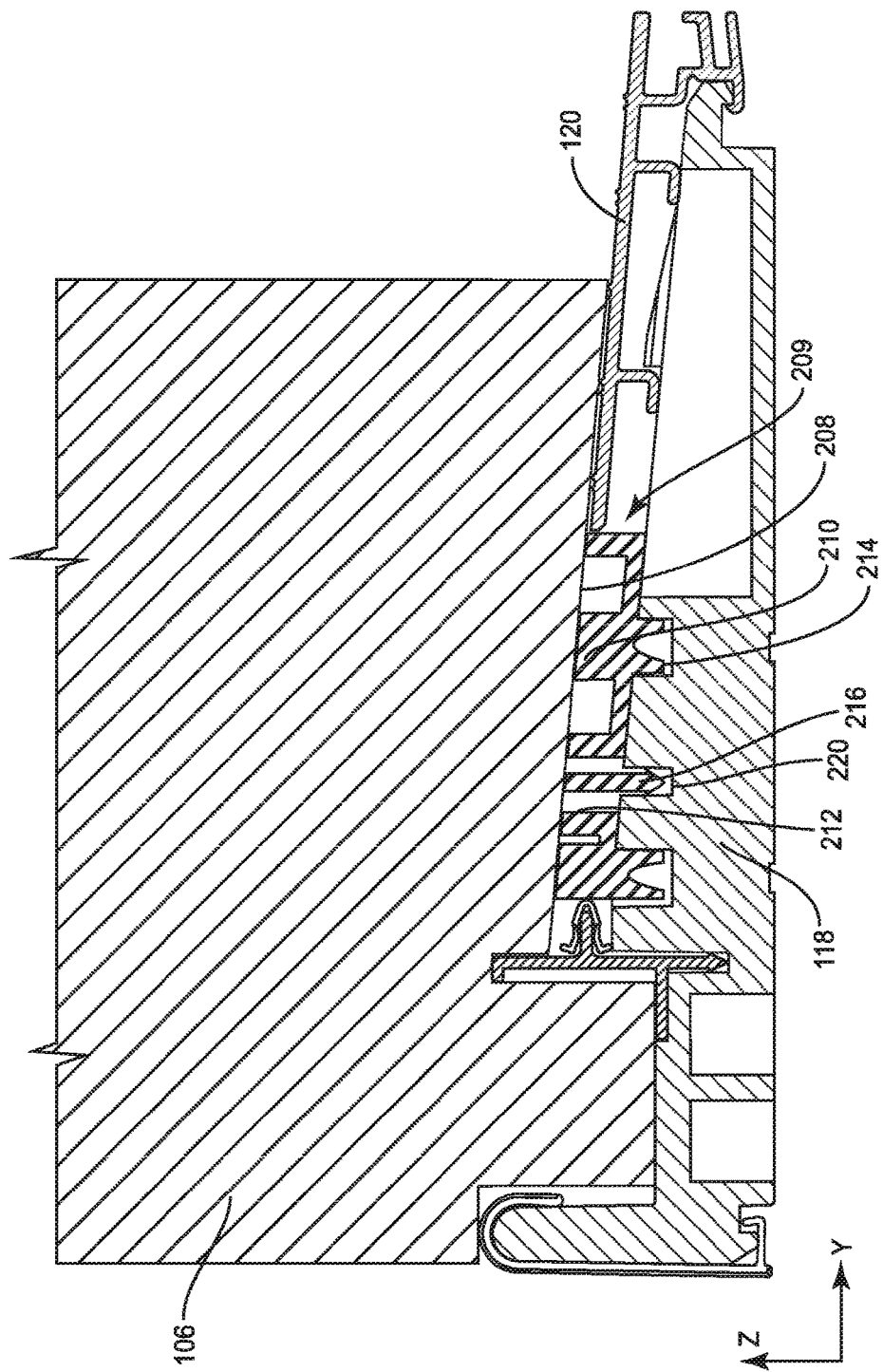
FIG. 11 is a cross sectional side view of a doorsill supporting a mullion according to embodiments of the present disclosure taken along line 11-11 in FIG. 1.

In certain embodiments, a mullion 106 (FIG. 1) may be provided as part of an entryway 100, either between two doors or between a door and a sidelight. Turning to FIG. 11, in several of those embodiments, the bottom 208 of the mullion 106 will be sized to overlap portions of an installed sill deck 120, much in the same way as the abutment portions of the side jambs overlap the sill deck. Similarly, a gap 209 will generally be provided between the bottom 208 of the mullion 106 and the top side of the substrate 118 so that portions of the sill deck 120 may be accommodated within the gap. In these embodiments, it is desired that the mullion 106 is attached to and supported by the doorsill 102, particularly the substrate 118. To provide both the desired support to the bottom of the mullion 106 and the attachment to the substrate 118 while maintaining the gap 209, a spacer 210 may be inserted between the substrate 118 and the bottom of the mullion 106. The spacer 210 may include a top surface 212 supporting the bottom of the mullion 106, and a bottom surface 214 sitting on the top side of the substrate 118. A post 216 may extend down from the bottom surface 214 to help couple the spacer 210 to the substrate 118. The top surface 212 of the mullion spacer 210 is smaller than the bottom of the mullion 106 so that the bottom surface of the mullion overlaps and hides a portion of the sill deck 120. The sill deck may include a notch (not shown) that is larger than the spacer 210 so the sill deck 120 can surround the spacer 210 but where the notch is smaller than the bottom of the mullion 106 to be hidden from view when the sill deck 120 is install.

Returning again to FIG. 6, the top side of the substrate 118 may include an attachment channel 220 formed in to the top side, and extending along the length direction of the substrate 118 near the upwardly open channel 162. The attachment channel 220 is positioned to accept the post 216 of the spacer 210. The elongated nature of the attachment channel 220 allows for placement of the spacer 210 along the substrate 118 in the proper location for supporting the mullion 106. The attachment channel may have crush ribs 222 therein to create a friction fit with the at least one post 216.

A doorsill and an entryway with a spacer 210 as described by this section may be embodied by the following paragraphs:

Paragraph X. A doorsill comprising:
a substrate having at least one channel extending along a length direction of the substrate;
a mullion spacer selectively positioned along the length of the substrate by at least one post extending from a bottom surface of the mullion spacer into the channel; and
a sill deck disposed over the substrate, the sill deck shaped to at least partially surround the mullion spacer.

Paragraph Y. The doorsill of Paragraph X, wherein the channel comprises crush ribs to create a friction fit with the at least one post.

Paragraph Z. An entryway comprising:
the doorsill according to Paragraph V; and
a mullion extending up from the doorsill and supported upon the mullion spacer.

Paragraph AA. The entryway of Paragraph Z, a top surface of the mullion spacer is smaller than a bottom surface of the mullion such that the bottom surface of the mullion overlaps and hides a portion of the sill deck.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A doorsill for forming a bottom of an entryway, comprising:
a substrate to be disposed above a subfloor;
a sill deck removably disposed on the substrate; and
a lifter provided on the substrate capable of extending from a bottom of the substrate,
wherein the lifter is adjustable to change an orientation or position of the bottom of the substrate relative to the subfloor, and adjustment of at least a portion of the lifter requires the sill deck to be removed from the substrate, wherein the lifter comprises two or more jacks independently adjustable with respect to the bottom of the substrate,
wherein each jack comprises:
a pad; and
at least one adjustment screw connecting the pad to the substrate, wherein rotating the adjustment screw extends or retracts the pad with respect to the bottom of the substrate.

2. The doorsill of claim 1, wherein the substrate comprises integral anchor points for positioning fasteners that attach the substrate to the subfloor.

3. The doorsill of claim 1, wherein each jack comprises a pair of adjustment screws, with one screw corresponding with each end of the pad.

4. The doorsill of claim 1, wherein the bottom of the substrate comprises recesses configured to fully receive each pad in a fully retracted position.

5. The doorsill of claim 1, further comprising:
at least one indicator attached to the substrate to indicate when the doorsill is in a level position.

6. The doorsill of claim 5, wherein the at least one indicator is a bullseye bubble level.

7. The doorsill of claim 5, wherein the at least one indicator is removably attached to the substrate by one or more resilient fins integrated with the substrate.

8. The doorsill of claim 5, wherein the at least one indicator is hidden from view when the sill deck is positioned over the substrate.

9. A doorsill, comprising:
a substrate to be disposed above a subfloor; and
a lifter provided on the substrate to change an orientation or position of a bottom of the substrate relative to the subfloor, wherein the lifter comprises:
at least two pairs of adjustment screws, each adjustment screw independently adjustable with respect to the bottom of the substrate,
wherein the adjustment screws of each pair are arranged along a first direction relative to one another, and the pairs of adjustment screws are arranged along a second direction relative to one another,
wherein the first direction is substantially perpendicular to the second direction such that the lifter is capable of adjusting both a tilt and a pitch of the substrate.

10. The doorsill of claim 9, further comprising:
an upwardly open channel at least partially defined by the substrate; and
a threshold cap removably disposed at least partially within the upwardly open channel,
wherein the threshold cap prevents rotation of at least some of the at least two pairs of adjustment screws when the threshold cap is positioned within the upwardly open channel, and removing the threshold cap provides access to the at least some of the at least two pairs of adjustment screws to allow for rotation thereof.

11. The doorsill of claim 9, further comprising a sill deck removably disposed on the substrate, and adjustment of at least a portion of the lifter requires the sill deck to be removed from the substrate.

12. The doorsill of claim 9, wherein the substrate comprises integral anchor points for positioning fasteners that attach the substrate to the subfloor.

13. The doorsill of claim 9, further comprising at least one pad attached to the at least two pairs of adjustment screws.

14. The doorsill of claim 13, wherein the bottom of the substrate comprises at least one recess configured to fully receive the at least one pad in a fully retracted position.

15. The doorsill of claim 9, further comprising:
at least one indicator attached to the substrate to indicate when the doorsill is in a level position.

16. The doorsill of claim 15, wherein the at least one indicator is a bullseye bubble level.

17. The doorsill of claim 15, wherein the at least one indicator is removably attached to the substrate by one or more resilient fins integrated with the substrate.

18. The doorsill of claim 15, wherein the at least one indicator is hidden from view when a sill deck is positioned over the substrate.

* * * * *